Aug. 8, 1967  KANAME KANEMARU ET AL  3,334,573
PERCOLATOR

Filed Sept. 27, 1965  2 Sheets-Sheet 1

INVENTOR.
BY Kaname Kanemaru
Akira Nagaoka

By, Wenderoth, Lind & Ponack
attorneys

United States Patent Office 3,334,573
Patented Aug. 8, 1967

3,334,573
PERCOLATOR
Kaname Kanemaru, 23 Kojicho Ichiban, Kadoma, Osaka Prefecture, Japan, and Akira Nagaoka, 655 Kyuhoji, Yao, Osaka Prefecture, Japan
Filed Sept. 27, 1965, Ser. No. 490,395
5 Claims. (Cl. 99—292)

ABSTRACT OF THE DISCLOSURE

A percolator comprising a boiler having a mouth at the top thereof, a percolating chamber having a downwardly tapering extension on the lower end thereof, a stopper around said extension fitting tightly into the mouth of said boiler, the lower end of said tapering extension having a neck with a tube holding means therein, a lower vertical tube fitted tightly into said tube holding means and extending upwardly within said tapering extension, an upper vertical tube in said percolating chamber and into which the upper end of said lower vertical tube extends and engages tightly, said upper vertical tube having a globular chamber at the top thereof with apertures in the wall thereof opening into the interior of said percolating chamber, valve means in said upper vertical tube between the upper end of said lower vertical tube and said globular chamber, and a flat disk-shaped wall portion on said upper vertical tube below the upper end of said lower vertical tube having apertures therein and extending outwardly adjacent the upper end of the tapering extension and then inwardly and downwardly with a diameter larger than said lower vertical tube, and cooperating projection means at the lower end of said upper vertical tube and on the inside of said tapering extension for holding said flat disk-shaped wall portion against the upper end of said tapering extension with a filter cloth over said flat disk-shaped wall portion.

---

This invention relates to a percolator, in which water contained in an air-tight boiler is boiled by heating, sent up by the steam pressure through a lower vertical tube to the top of a globular chamber on the end of an upper vertical tube, and then sprayed down through apertures into a percolating chamber to boil coffee powder inside the percolating chamber. The percolator is provided with an independent filtering chamber separate from the vertical tube, which is drawn down and secured inside the vacuum boiler through a downwardly extending connecting channel.

Unlike the ordinary case, this percolator has no metals at all in any of its component parts, so that it never harms the aroma and flavor peculiar to coffee. Furthermore, being made of glass, it is easy to see into it from outside to see how the coffee powder is boiled by the hot water spouting down through the apertures.

As a rule, the art of percolation requires many years experience and skill until the same flavor is obtained each time. In the case of the ordinary percolator, therefore, it is difficult to obtain the said result without many years experience.

On the other hand, the percolator of this invention is so designed as to enable anybody to obtain the same aroma and flavor each time regardless of his experience, skill, and all other factors.

The invention will be explained in connection with the drawings, in which.

Figure 1:
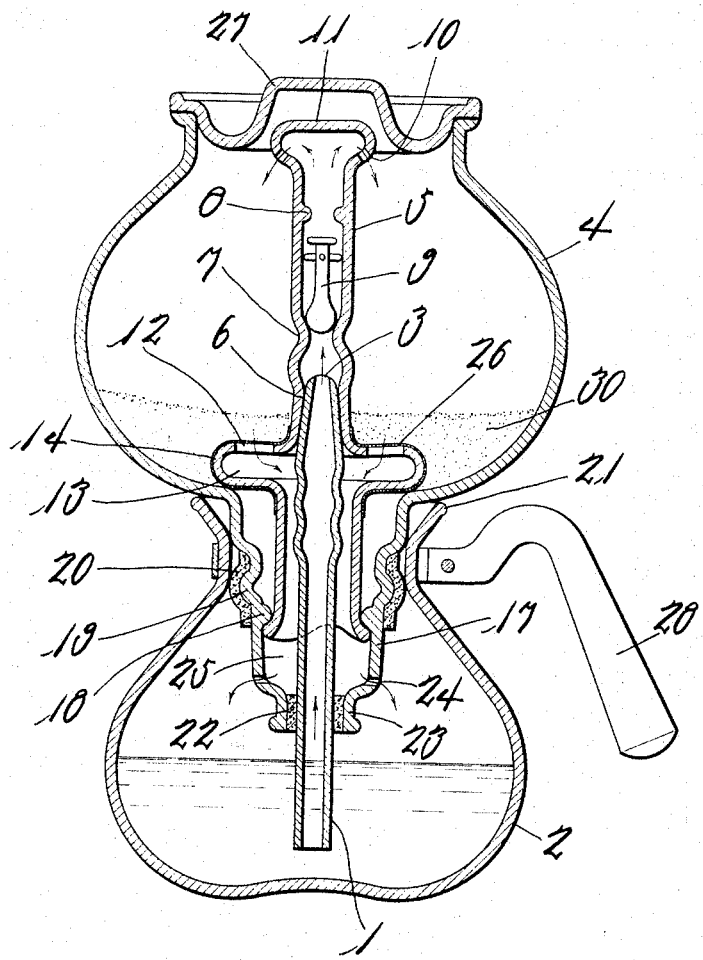
FIGURE 1 is a perpendicular section of the percolator of this invention.
Figure 2:
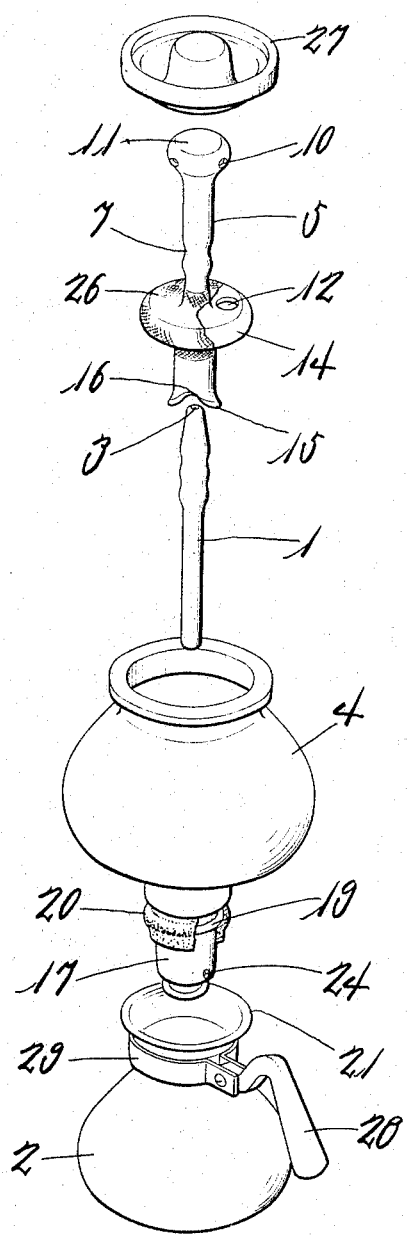
FIGURE 2 is an exploded perspective view of the component parts.

As shown in FIGURES 1 and 2, the lower mouth of a lower vertical tube 1 opens into the center of the inside of the boiler 2, while the upper end 3 is tightly engaged with and opens into the neck 6 of an upper vertical tube 5 provided in the center of the percolating chamber 4. The said vertical tube 5 is equipped with a lift valve 9 which rises and falls freely between the reduced diameter portions 7 and 8 provided above the neck 6. At the upper end of the lift valve 9 is located a globular chamber 11 with several apertures 10 around the periphery thereof.

Below the neck 6 of the vertical tube 5 is formed a flat disk-shaped hollow 13 having several apertures 12 in the top surface thereof and the wall 14 thereof forms a support for a filter. Spirally extending projections 15 are provided at the lower end of the vertical tube 5 and have a pair of notches 16 between them. The projections 16 cooperate with a pair of projections 18 facing each other inside the lower tapering extension 17 of the percolating chamber 4.

A stopper 20 is fixed around a protruding ring 19 on the outside of the said tapering part 17, which stopper is then fixed in the upper mouth 21 of the boiler 2.

The lower end of the tapering part 17 of the percolating chamber 4 has a neck 23 which holds a packing fitting tightly around the vertical tube 1 and defining a cravity 25. The wall of the tapering extension 17 has apertures 24 which open into the interior of boiler 2 from the hollow 13 inside the wall 14 forming part of the vertical tube 5.

On the outside of the wall 14 of the disk-shaped hollow 13 is positioned a filter cloth 26, which is tightly fastened between the mouth of the tapering part 17 of the percolating chamber 4 and the wall 14.

The upper mouth of the percolating chamber 4 has a lid 27 thereon. All of the component parts of this percolator are made of glass except the afore-mentioned stopper 20 and packing 22. A handle 28 is supported by an adjustable metal band 29 around the mouth 21 of the boiler 2. Coffee powder is shown at 30.

The operation of the percolator of this invention is as follows: An appropriate quantity of water is put inside the boiler 2, coffee powder 30 is put into the percolating chamber 4, and the boiler is heated from below. The boiling water inside the closed boiler is pushed up the vertical tube 1 by the steam pressure in the direction indicated by the arrow. It enters the vertical tube 5 through the mouth at the upper end 3, pushes up the valve 9, goes up further inside the vertical tube 5, and sprays down through the apertures 10 of the globular chamber 11 at the top into the percolating chamber 4, boiling the coffee powder therein. The boiled coffee liquid flows into the hollow 13 and the lower cavity 25 through the filter cloth 26 against the wall 14 and through holes 12. Then it flows into the vacuum boiler through the apertures 24 at the lower end of the said cavity 25.

As mentioned above, the percolator of this invention has an extremely simple construction, is quite safe, is easy to handle and is most convenient both for household and business use, as it enables anyone to prepare coffee of the same aroma and flavor at all times.

The above-described device can of course be modified in many ways, and the specification of this invention is not restricted to what is mentioned above.

What we claim is:

1. A percolator comprising a boiler having a mouth at the top thereof, a percolating chamber having a downwardly tapering extension on the lower end thereof, a stopper around said extension fitting tightly into the mouth of said boiler, the lower end of said tapering extension having a neck with a tube holding means therein, a lower vertical tube fitted tightly into said tube holding means and extending upwardly within said tapering extension, an upper vertical tube in said percolating chamber and into which the upper end of said lower vertical tube extends and engages tightly, said upper vertical tube having a globular chamber at the top thereof with apertures in the wall thereof opening into the interior of said percolating chamber, valve means in said upper vertical tube between the upper end of said lower vertical tube and said globular chamber, and a flat-disk-shaped wall portion on said upper vertical tube below the upper end of said lower vertical tube having apertures therein and extending outwardly adjacent the upper end of the tapering extension and then inwardly and downwardly with a diameter larger than said lower vertical tube, and cooperating projection means at the lower end of said upper vertical tube and on the inside of said tapering extension for holding said flat disk-shaped wall portion against the upper end of said tapering extension with a filter cloth over said flat disk-shaped wall portion.

2. A percolator as claimed in claim 1 in which said tube holding means in the neck in the lower end of said tapering extension is a packing fitting tightly around said lower vertical tube, and said neck has a plurality of apertures therein opening into said boiler.

3. A percolator as claimed in claim 1 in which said projections on the lower end of said upper vertical tube and the inside of the tapering extension have spiral surfaces, and have notches between them, whereby the extensions on the upper vertical tube can be passed between the projections on the tapering extension and the upper vertical tube turned to screw the upper vertical tube into engagement with the tapering extension.

4. A percolator as claimed in claim 1 in which said upper vertical tube has two reduced diameter portions spaced along the length thereof between the upper end of said lower vertical tube and said globular chamber, and said valve means comprises a lift valve freely movable between said reduced diameter portions and having a valve portion cooperating with the lower of said portions to close said upper vertical tube.

5. A percolator as claimed in claim 1 in which said boiler, percolator chamber and tapered extension and upper and lower vertical tubes are of glass.

References Cited

UNITED STATES PATENTS

| | | | |
|---|---|---|---|
| 1,822,238 | 9/1931 | Albanese | 99—292 |
| 2,175,440 | 10/1939 | Masin | 99—292 |
| 2,275,746 | 3/1942 | Edwards | 99—292 |
| 2,314,543 | 3/1943 | Kopf | 99—292 |
| 2,360,569 | 10/1944 | Masin | 99—292 |
| 2,480,232 | 8/1949 | Francis. | |
| 2,543,528 | 2/1951 | Kaufmann | 99—292 |
| 2,756,667 | 7/1956 | Burns | 99—292 X |

FOREIGN PATENTS

| | | |
|---|---|---|
| 1,371,339 | 7/1964 | France. |
| 642,090 | 7/1962 | Italy. |

WALTER A. SCHEEL, *Primary Examiner.*

S. P. FISHER, *Assistant Examiner.*